(12) United States Patent  
Yamada

(10) Patent No.: US 7,393,899 B2
(45) Date of Patent: Jul. 1, 2008

(54) RUBBER COMPOSITION

(75) Inventor: Ritsuko Yamada, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 108 days.

(21) Appl. No.: 10/530,532

(22) PCT Filed: Oct. 7, 2003

(86) PCT No.: PCT/JP03/12844

§ 371 (c)(1), (2), (4) Date: Apr. 6, 2005

(87) PCT Pub. No.: WO2004/031288

PCT Pub. Date: Apr. 15, 2004

(65) Prior Publication Data

US 2005/0272869 A1 Dec. 8, 2005

(30) Foreign Application Priority Data

Oct. 7, 2002 (JP) ............................. 2002-293615

(51) Int. Cl.
*C08L 7/00* (2006.01)
*C08L 9/00* (2006.01)
*C08L 66/00* (2006.01)

(52) U.S. Cl. ................ 525/152; 525/135; 525/137; 525/138; 525/139

(58) Field of Classification Search ................ None
See application file for complete search history.

(56) References Cited

U.S. PATENT DOCUMENTS 3,674,723 A * 7/1972 Vredenburgh et al. ....... 525/133
3,960,982 A * 6/1976 Numata et al. .............. 525/500
4,703,086 A * 10/1987 Yamamoto et al. ......... 525/133

FOREIGN PATENT DOCUMENTS

DE 10052287 A1 4/2002

| | | | |
|---|---|---|---|
| EP | 967244 | * | 12/1999 |
| GB | 992359 | A | 5/1965 |
| GB | 1069983 | A | 5/1967 |
| JP | 05-98080 | A | 4/1993 |
| JP | 09-40754 | A | 2/1997 |
| JP | 09-268219 | A | 10/1997 |
| JP | 2000-80205 | A | 3/2000 |
| JP | 2002-194310 | A | 7/2002 |
| JP | 203-286391 | A | 10/2003 |
| JP | 2003-286390 | A | 10/2003 |
| JP | 2004-075748 | A | 3/2004 |

* cited by examiner

*Primary Examiner*—David Buttner
(74) *Attorney, Agent, or Firm*—Sughrue Mion, PLLC

(57) ABSTRACT

As a rubber composition having an elasticity further increased as compared with the conventional rubber composition while preventing the lowering of the fracture resistance, there is provided a rubber composition comprising a rubber component of at least one of natural rubber and synthetic diene rubbers and a phenolic resin compounded therein and represented by the following formula (I):

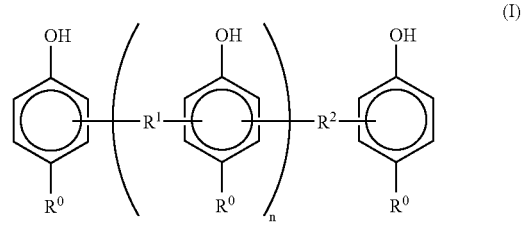

(wherein $R^0$ is a hydrogen atom, an alkyl group, a phenyl group or a methylol group, and each of $R^1$ and $R^2$ is an arylene group, an alkylene group having a carbon number of 2-10, an aralkylene group, a cycloalkenylene group or a cycloalkadienylene group, and n is 0-10).

15 Claims, No Drawings

RUBBER COMPOSITION

TECHNICAL FIELD

This invention relates to a rubber composition, and more particularly to a rubber composition including a phenolic resin of a specific structure suitable for use in a carcass member of a tire, a conveyor belt, a hose and the like.

BACKGROUND ART

As a countermeasure for increasing an elasticity of a rubber, there have hitherto been proposed a method of increasing an amount of a filler, a method of increasing an amount of sulfur to increase the number of crosslinking points, and the like. However, these methods have a problem that the characteristics such as fracture resistance and the like are considerably deteriorated.

On the contrary, as a countermeasure for increasing the elasticity of the rubber while suppressing the lowering of the fracture resistance of rubber, there are proposed a method of adding a non-modified novolac-type or resole-type phenolic resin, and a method of adding a phenolic resin modified with an unsaturated oil such as tall oil or cashew oil or an aromatic hydrocarbon such as xylene or mesitylene. These methods are widely used for increasing the elasticity while suppressing the lowering of the fracture resistance (see, for example, JP-A-5-98081 and JP-A-2001-226528).

However, performances required in the rubber become very severer in recent years, and hence it is required to further increase the elasticity of the rubber while suppressing the lowering of the fracture resistance of the rubber. The aforementioned method of adding the non-modified phenolic resin or the modified phenolic resin is insufficient in the meaning that the elasticity of the rubber is further increased while suppressing the lowering of the fracture resistance.

DISCLOSURE OF THE INVENTION

It is, therefore, an object of the invention to provide a rubber composition having an elasticity higher than that of the conventional technique while preventing the lowering of the fracture resistance.

The inventor has made various studies for achieving the above object and found that the elasticity can be further increased by adding a phenolic resin of a specific structure to the rubber composition while preventing the lowering of the fracture resistance.

That is, the rubber composition according to the invention is characterized by compounding a rubber component comprised of at least one of natural rubber and synthetic diene rubbers with a phenolic resin represented by the following formula (I):

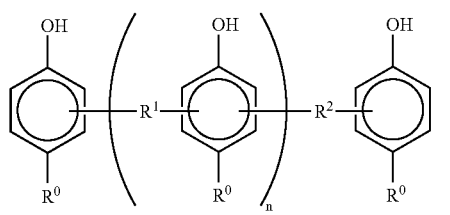

(I)

(wherein $R^0$ is a hydrogen atom, an alkyl group, a phenyl group or a methylol group, and each of $R^1$ and $R^2$ is an arylene group, an alkylene group having a carbon number of 2-10, an aralkylene group, a cycloalkenylene group or a cycloalkadienylene group, and n is 0-10).

In a preferable embodiment of the rubber composition according to the invention, each of $R^1$ and $R^2$ in the formula (I) is a xylylene group or [1,1'-biphenyl]-4,4'-dimethylene group.

In another preferable embodiment of the rubber composition according to the invention, $R^0$ in the formula (I) is a hydrogen atom.

In the other preferable embodiment of the rubber composition according to the invention, the compounding amount of the phenolic resin of the formula (I) is 1-30 parts by mass, more preferably 1-10 parts by mass per 100 parts by mass of the rubber component.

In a further preferable embodiment of the rubber composition according to the invention, a hardening agent as a methylene donor is contained in the rubber composition at an amount corresponding to 1-30% by mass of the phenolic resin of the formula (I). In this case, the hardening agent is preferable to be hexamethylene tetramine.

BEST MODE FOR CARRYING OUT THE INVENTION

The invention will be described in detail below. The rubber composition according to the invention is obtained by compounding the rubber component comprised of at least one of natural rubber and synthetic diene rubbers with the phenolic resin represented by the formula (I). The non-modified phenolic resin used in the conventional rubber composition and represented by the following formula (II) is low in the dispersibility to the rubber component such as natural rubber and synthetic diene rubber being low in the polarity because a distance between phenol group and phenol group as a polar functional group is short. Therefore, a portion of unevenly distributing the phenolic resin is existent in the rubber composition, and such a portion constitutes a starting point of breakage to lower the fracture resistance.

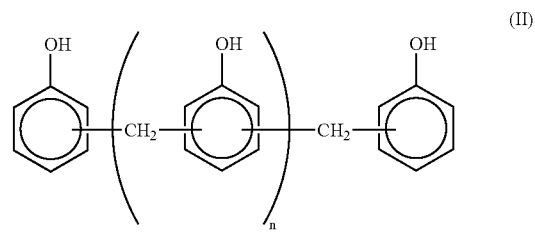

(II)

On the other hand, in the conventionally modified phenolic resin, the phenol resin is polymerized and thereafter the resulting polymer is modified, so that only a terminal of the molecule in the structure of the polymer is modified and a central portion thereof is the same as in the non-modified phenolic resin. As a result, the compatibility with the rubber component is improved in the terminal of the molecule, but the compatibility in the central portion is low and hence satisfactory rubber properties are not obtained.

On the contrary, the phenolic resin represented by the formula (I) improves the compatibilities of both the terminal and central portion with the rubber component because phenol and xylylene are bonded at molecular unit as shown by the following formula (III).

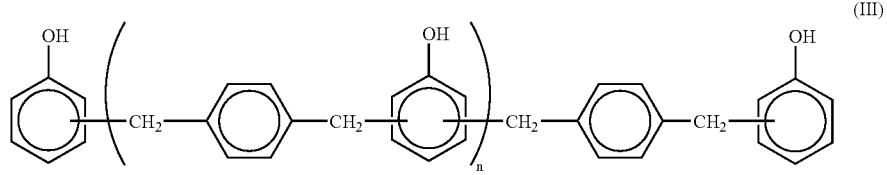

Particularly, in the phenolic resin of the formula (I), a plurality of phenols are bonded through a bivalent group larger than methylene, so that a distance between phenol group and phenol group as a polar functional group becomes longer than that of non-modified or modified phenolic resins conventionally used in the rubber composition. Therefore, the phenolic resin of the formula (I) is low in the polarity as compared with the non-modified and modified phenolic resins, so that ① the dispersibility in the rubber component is improved and hence the elasticity of the rubber composition can be largely increased. Also, since the dispersibility in the rubber component is good, a uniform portion as a starting point of breakage is not existent in the rubber composition according to the invention, so that ② the form after the hardening is stronger to stress and the lowering of the fracture resistance is suppressed at minimum.

As the rubber component constituting the rubber composition according to the invention are mentioned natural rubber (NR); and synthetic diene rubbers such as polyisoprene rubber (IR), butyl rubber (IIR), polybutadiene rubber (BR), styrene-butadiene copolymer rubber (SBR) and the like. These rubber components may be used alone or in a blend of two or more.

The phenolic resin used in the rubber composition according to the invention is represented by the formula (I). In the formula (I), the number of repeat units n is 0-10. Also, $R^0$ is a hydrogen atom, an alkyl group, a phenyl group or a methylol group. In this case, the alkyl group includes methyl group, ethyl group and the like. Among them, the hydrogen atom is preferable as $R^0$ in view of the hardening reaction.

In the formula (I), each of $R^1$ and $R^2$ is an arylene group, an alkylene group having a carbon number of 2-10, an aralkylene group, a cycloalkenylene group or a cycloalkadienylene group. Although $R^1$ and $R^2$ are methylene groups in the phenolic resin compounded in the conventional rubber composition for the purpose of increasing the elasticity, R1 and R2 of the phenolic resin used in the invention are bivalent groups larger than methylene group, so that the distance between the phenol groups becomes longer and the aforementioned effect is developed. As the arylene group are mentioned phenylene group and the like. As the alkylene group having a carbon number of 2-10 are mentioned ethylene group, propyloene group and the like. As the aralkylene group are mentioned xylylene group, [1,1'-biphenyl]-4,4'-dimethylene group and the like. As the cycloalkenylene group are mentioned cyclohexylene group, dicyclodecylene group, tricyclodecylene group and the like. As the cycloalkadienylene group are mentioned cyclopentadienylene group and the like. Among them, xylylene group or [1,1'-biphenyl]-4,4'-dimethylene group is preferable as $R^1$ and $R^2$.

As the phenolic resin of the formula (I) compounded in the rubber composition according to the invention can be used commercially available phenolic resins, for example, MEH-7800, MEH-7851 and the like made by Meiwa Kasei Co., Ltd.

The compounding amount of the phenolic resin of the formula (I) is 1-30 parts by mass, preferably 1-10 parts by mass per 100 parts by mass of the rubber component. When the amount is less than 1 part by mass, the hardening performance is insufficient, while when it exceeds 30 parts by mass, the flexibility as the rubber is damaged.

The rubber composition according to the invention is preferable to further contain a hardening agent as a methylene donor. However, when R0 is methylol group, the phenolic resin itself is self-hardening, and hence the hardening agent is useless. As the hardening agent are mentioned hexamethylene tetramine, hexamethyl methylol melamine and the like. In this case, the compounding amount of hardening agent is 1-30% by mass of the phenolic resin of the formula (I). When the amount is less than 1% by mass, the hardening of the phenolic resin is not sufficiently promoted, while when it exceeds 30% by mass, the crosslinking system of rubber is badly affected.

In addition to the rubber component, phenolic resin and hardening agent as mentioned above, the rubber composition according to the invention may be properly compounded with additives usually used in the rubber industry such as fillers, softening agents, anti-oxidants, vulcanizing agents, vulcanization accelerators and the like.

The following examples are given in illustration of the invention and are not intended as limitations thereof.

EXAMPLES

A rubber composition is prepared according to a compounding recipe shown in Table 1 and vulcanized at 145° C. for 30 minutes to prepare a sample, which is subjected to a hardness test, a tensile test and a dynamic viscoelastic test by the following methods, respectively. The results are represented by an index on the basis that Comparative Example 1 is 100 and shown in Table 1. Moreover, the phenolic resin used in Example 1 is represented by the formula (III), and the phenolic resin used in Example 2 is represented by the following formula (IV):

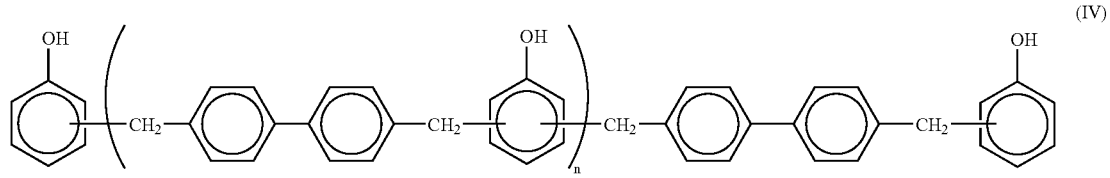

With respect to the vulcanized rubber compositions, JIS A (Measurement of Hardness) hardness is measured according to JIS K6253.

(Tensile Test)

A dumbbell type JIS No. 3 sample is prepared from the vulcanized rubber composition and subjected to a tensile test at 25° C. according to JIS K6251 to measure elongation at break, tensile strength and tensile stress at an elongation of 50%.

(Dynamic Viscoelastic Test)

With respect to the vulcanized rubber compositions, the dynamic storage modulus of elasticity (E') and loss tangent (tan δ) are measured under 1% strain and a measuring temperature of 25° C. using a spectrometer made by Toyo Seiki Co., Ltd.

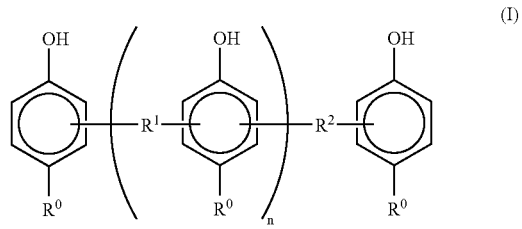

(wherein $R^0$ is a hydrogen atom, an alkyl group, a phenyl group or a methylol group, and each of $R^1$ and $R^2$ is an

TABLE 1

|  |  | Comparative Example 1 | Comparative Example 2 | Example 1 | Example 2 |
|---|---|---|---|---|---|
| Natural rubber | parts by | 100 | 100 | 100 | 100 |
| Carbon black HAF | mass | 50 | 50 | 50 | 50 |
| Aromatic oil |  | 5 | 5 | 5 | 5 |
| Stearic acid |  | 3 | 3 | 3 | 3 |
| Zinc oxide |  | 4 | 4 | 4 | 4 |
| Non-modified phenolic resin *1 |  | 10 | — | — | — |
| Phenolic resin (modified with cashew) *2 |  | — | 10 | — | — |
| Phenolic resin (xylylene type) *3 |  | — | — | 10 | — |
| Phenolic resin (biphenylene type) *4 |  | — | — | — | 10 |
| Hexamethylene tetramine |  | 1 | 1 | 1 | 1 |
| Antioxidant 6PPD *5 |  | 1 | 1 | 1 | 1 |
| Vulcanization accelerator TBBS *6 |  | 1.5 | 1.5 | 1.5 | 1.5 |
| Sulfur |  | 2 | 2 | 2 | 2 |
| Hardness | index | 100 | 105 | 105 | 110 |
| Elongation at break |  | 100 | 89 | 98 | 97 |
| Tensile strength |  | 100 | 83 | 91 | 97 |
| Tensile stress at 50% elongation |  | 100 | 110 | 128 | 159 |
| Dynamic storage elasticity (E') |  | 100 | 121 | 135 | 190 |
| Loss tangent (tan δ) |  | 100 | 104 | 100 | 107 |

*1: PR-50731 made by Sumitomo Bakelite Co., Ltd. softening point 95° C.
*2: PR-12686 made by Sumitomo Bakelite Co., Ltd. softening point 75° C.
*3: MEH-7800-3H made by Meiwa Kasei Co., Ltd. number of repeat units (n) = 0-7, softening point 102° C.
*4: MEH-7851-4H made by Meiwa Kasei Co., Ltd. number of repeat units (n) = 0-7, softening point 130° C.
*5: N-(1,3-dimethylbutyl)-N'-phenyl-p-phenylene diamine
*6: N-t-butyl-2-benzothiazole sulfenamide In Comparative Example 2, the drynamic storage modulus and loss tangent are raised to increase the elasticity by replacing the non-modified phenolic resin of Comparative Example 1 with the modified phenolic resin, but the elongation at break and the tensile strength are lowered to largely lower the fracture resistance.

On the other hand, in Examples 1 and 2 using the xylylene type or biphenylene type phenolic resin, the lowering of the elongation at break and tensile strength is suppressed and the dynamic storage modulus of elasticity and loss tangent are improved while preventing the lowering of the fracture resistance, whereby the elasticity can be considerably increased.

INDUSTRIAL APPLICABILITY

According to the invention, there can be provided rubber compositions having a considerably high elasticity while preventing the lowering of the fracture resistance by compounding the phenolic resin of the specific structure to the rubber component.

The invention claimed is:

1. A rubber composition characterized by compounding a rubber component consisting of natural rubber and/or polyisoprene rubber with a phenolic resin represented by the following formula (I):

arylene group, an aralkylene group, a cycloalkenylene group or a cycloalkadienylene group, and n is 0-10).

2. A rubber composition according to claim 1, wherein each of $R^1$ and $R^2$ in the formula (I) is a xylylene group.

3. A rubber composition according to claim 1, wherein each of $R^1$ and $R^2$ in the formula (I) is [1,1'-biphenyl]-4,4'-dimethylene group.

4. A rubber composition according to claim 1, wherein $R^0$ in the formula (I) is a hydrogen atom.

5. A rubber composition according to claim 1, wherein the compounding amount of the phenolic resin of the formula (I) is 1-30 parts by mass per 100 parts by mass of the rubber component.

6. A rubber composition according to claim 5, wherein the compounding amount of the phenolic resin of the formula (I) is 1-10 parts by mass per 100 parts by mass of the rubber component.

7. A rubber composition according to claim 1, wherein a hardening agent as a methylene donor is contained in the rubber composition at an amount corresponding to 1-30% by mass of the phenolic resin of the formula (I).

8. A rubber composition according to claim 7, wherein the hardening agent is hexamethylene tetramine.

9. A rubber composition according to claim 2, wherein $R^0$ in the formula (I) is a hydrogen atom.

10. A rubber composition according to claim 3, wherein $R^0$ in the formula (I) is a hydrogen atom.

11. A rubber composition according to claim 2, wherein the compounding amount of the phenolic resin of the formula (I) is 1-30 parts by mass per 100 parts by mass of the rubber component.

12. A rubber composition according to claim 3, wherein the compounding amount of the phenolic resin of the formula (I) is 1-30 parts by mass per 100 parts by mass of the rubber component.

13. A rubber composition according to claim 4, wherein the compounding amount of the phenolic resin of the formula (I) is 1-30 parts by mass per 100 parts by mass of the rubber component.

14. A rubber composition according to claim 9, wherein the compounding amount of the phenolic resin of the formula (I) is 1-30 parts by mass per 100 parts by mass of the rubber component.

15. A rubber composition according to claim 10, wherein the compounding amount of the phenolic resin of the formula (I) is 1-30 parts by mass per 100 parts by mass of the rubber component.

* * * * *